United States Patent [19]

Omura et al.

[11] Patent Number: 4,908,989

[45] Date of Patent: Mar. 20, 1990

[54] DOOR GLASS RUN FOR AUTOMOBILES

[75] Inventors: Masayuki Omura, Tsushima; Mitsuo Hamabata, Bisai, both of Japan

[73] Assignee: Toyoda Gosei Co., Ltd., Nishikasugai, Japan

[21] Appl. No.: 382,230

[22] Filed: Jul. 20, 1989

[30] Foreign Application Priority Data

Aug. 10, 1988 [JP] Japan ............................... 63-199624

[51] Int. Cl.[4] .............................................. E06B 7/16
[52] U.S. Cl. ......................................... 49/441; 49/502
[58] Field of Search ................. 49/441, 440, 459, 458, 49/502

[56] References Cited

U.S. PATENT DOCUMENTS

| 3,258,876 | 6/1966 | Deisenroth | 49/441 |
| 4,616,446 | 10/1986 | Okamoto | 49/441 |
| 4,649,668 | 3/1987 | Skillen et al. | 49/441 X |
| 4,653,230 | 3/1987 | Seo et al. | 49/441 X |
| 4,817,336 | 4/1989 | Kisanuki | 49/476 |
| 4,880,681 | 1/1989 | Skillen et al. | 49/441 X |

Primary Examiner—Philip C. Kannan

Attorney, Agent, or Firm—Cushman, Darby & Cushman

[57] ABSTRACT

A door glass-run for automobiles is used in the fitted state to the frame of a car-door whose window opening is divided vertically by a division-bar such that a liftable-window and a quarter-window assembly are fitted to the window opening with the division-bar constructing part of the quarter-window assembly. The glass-run comprises a roof-side portion for holding the respective upper sides of the liftable-window and the quarter-window which includes a design lip disposed outside the car, and a division-bar portion branched from the roof-side portion. The roof-side portion is made of an integrally extruded component. The roof-side portion is notched at a branch section, from which the division-bar portion branches, to define a notched portion which includes at least the design lip. The notched portion is connected at its face on the side of the liftable window via a molded portion with a separate division bar portion. A slit of predetermined length is formed extending from the face on the side of the liftable window toward a root portion so that the division bar portion can be bent independently of the design lip.

3 Claims, 5 Drawing Sheets

DOOR GLASS RUN FOR AUTOMOBILES

BACKGROUND OF THE INVENTION

Field of the Invention

This invention relates to a door glass-run (hereinafter referred to as a glass-run) which is fitted to the frame of a car door with a quarter window. The shape of the window is not necessarily limited to triangular, but may be trapezoidal as well as quarter.

The following description will be written taking, as an example, a glass-run to be fitted to the frame F of a car front-door D with a quarter-window as shown in FIG. 1, this being similarly applicable to a rear door.

The window opening of the front-door D is divided vertically by a division-bar 1 such that a liftable glass 3 and a quarter-window assembly 5 inclusive of a quarter-window 4 are fitted to the window opening with the division-bar 1 consitituting part of the quarter window assembly 5.

FIG. 2 is a general front view of a conventional glass-run. This glass-run has a glass-gripping groove as shown in FIG. 3 in sectional view, and comprises a roof-side portion 11 which is adapted to hold the respective upper sides of the liftable glass 3 and the quarter-window assembly 5, and a division bar portion 18 which is branched from the roof-side portion 11 and has a glass-slide groove as shown in FIG. 4. The roof-side portion 11 includes a design lip 12 disposed outside the car. After the quarter-window assembly 5 is fitted to the frame F, the division-bar portion 18 is inserted in a notched portion 13 of the roof-side portion 11 and fitted to the division-bar 1. As shown FIG. 5, the sectional shape of this notched portion 13 is such that there remain the design lip 12, a connecting wall 14, and an outside slide-lip 15 connected with the connecting wall 14.

However, since the division-bar portion is simply inserted in the notched portion 13 of the roof-side portion 11, there was a fear of water leaking through some gaps present in such an inserted section when the car equipped with such a glass-run was driven in a heavy rain or washed with pressurized water. Further, such a configuration sometimes caused generation of the sound of wind during high-speed travelling.

In solving the foregoing problems of the prior art, the present inventor came up with the idea that a branch section 9 of the division-bar portion 18 should be molded, and examined such a configuration as shown in FIG. 6. According to this idea, the roof-side portion 11 is cut off at the branch section; the respective ends of three extruded components: a liftable-glass part of, a quarter-window assembly part of the roof-side portion, and a division-bar part, are inserted in a mold; and molding material is forced into a cavity defined in the mold to complete molding.

However, it was found that such a molding procedure resulted in the following problems:

(1) Since the extruded components must be inserted in three directions, the mold becomes complicated in structure, and the work of setting the extruded components is troublesome, thereby degrading productivity.

(2) A connecting line 1 appears between the thus molded portion and each extruded component (on the side of the design lip portion 12), this being undesirable for the purpose of enhancing appearance and quality.

(3) Since the division-bar portion 18 is joined with the roof-side portion 11 by the molded portion 9, it is difficult to bend the division bar portion 18 in a relief direction when fitting the quarter window assembly and the division bar joined together, thereby lowering the working efficiency of the fitting of the quarter window assembly.

SUMMARY OF THE INVENTION

It is an object of the present invention to provide a glass run for automobiles which is free of the foregoing problems.

To achieve the foregoing object, a glass run for automobiles according to the present invention, which is adapted to be fitted to the frame of a car door whose window opening is divided vertically by a division bar such that a liftable-window assembly and a quarter-window assembly are fitted to the window opening with the division-bar constituting part of the quarter window assembly, comprises a roof-side portion for holding the respective upper sides of the liftable-window and the quarter-window, and a division-bar portion branched from the roof-side portion, the roof-side portion including a design lip disposed on the outside thereof, and is characterized in that the roof-side portion is made of an integrally extruded component, a branch section of the division-bar portions is notched to define a notched portion which includes at least the design lip, the face, on the side of the liftable-window, of the notched portion is connected via a molded portion with the separate division-bar portion, and a slit of given length is formed extending from the face on the side of the liftable-window toward a root portion so that the division-bar portion can be bent independently of the design lip.

According to the present invention featuring the foregoing structure, (1) since the number of insertion directions of the extruded components is only two, a mold is more simplified in structure compared with that accepting three directions, and the work of setting the extruded components becomes easy, thereby enhancing productivity;

(2) the connecting line between the molded portion and the extruded component is hidden by the remaining design lip, thus cannot be seen from outside the car, this being preferable for the purpose of appearance and quality; and (3) since the division-bar portion is joined with the molded portion connected with the face, on the side of the liftable- glass, of the notched portion which is rendered bendable by the slit formed therein, when fitting the quarter-window assembly and the division-bar joined together, it is possible to set free the division- bar portion to facilitate the fitting work, thereby enhancing the working efficiency of the setting of the quarter-window assembly.

DESCRIPTION OF THE PREFERRED EMBODIMENT

Figure 1:
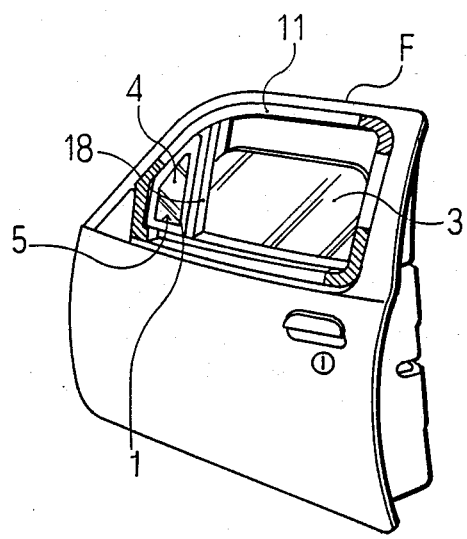
FIG. 1 is a perspective view, as viewed from rear, of a front door to which a glass-run for automobiles is fitted.
Figure 2:
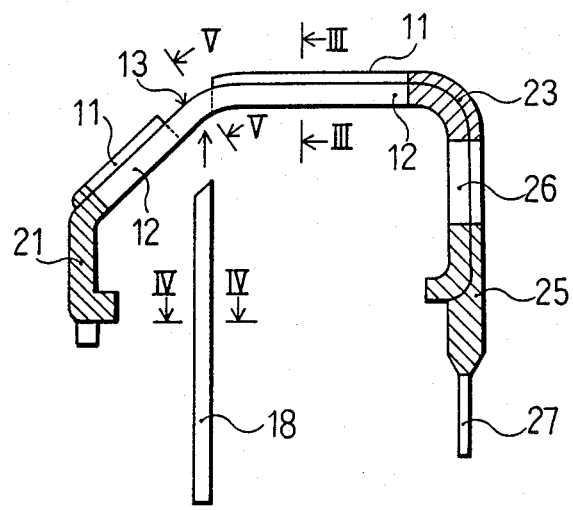
FIG. 2 is a general front view showing a conventional glass-run for automobiles.
Figure 3:
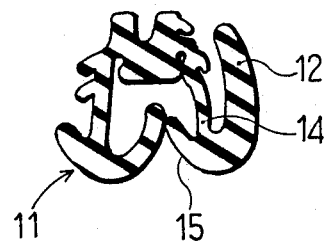
FIG. 3 is a sectional view taken along line III-III of FIG. 2.

An embodiment of the present invention will now be described with reference to the drawings. In the drawings, parts or portions identical with those of the prior art are designated by the same reference numerals and their descriptions will not be given here.

Figure 7:
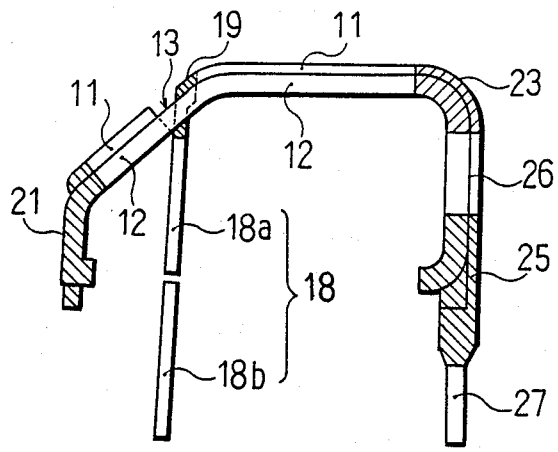
FIG. 7 is a general front view showing an embodiment of a glass-run for automobiles according to the present invention.

FIG. 7 generally shows an embodiment of a glass-run according to the present invention which is fitted to a front door.

This glass-run comprises a roof-side portion 11 for holding the respective upper sides of a liftable-glass 3 and a quarter-window assembly 5, a front molded portion 21 for holding the front side of the quarter-window assembly 5 which is connected with the front end of the roof-side portion 11, a corner molded portion 23 which is connected with the rear end of the roof-side portion 11, and vertical glass-run upper and lower portions 26 and 27 which are connected by a molded portion 25 with interposition of a door belt line, each portion being made of an integrally extruded component.

Figure 5:
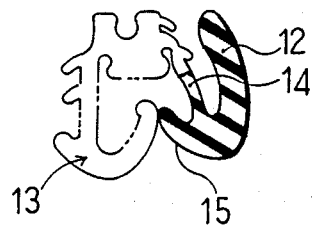
FIG. 5 is a sectional view taken along line V-V of FIG. 2.
Figure 6:
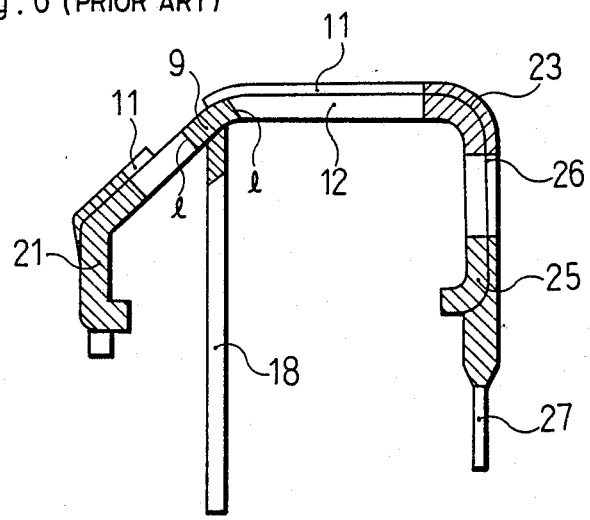
FIG. 6 is a general front view of a glass-run for automobiles subjected to examination to solve the problems of the prior art.

In a branch section of the roof-side portion 11 toward a division-bar portion 18, there is defined a notched portion 13 which includes at least a design lip 12. Specifically, as shown in FIG. 5, the sectional shape of this notched portion 13 is such that for the purpose of preserving the appearance of the design lip 12, there remain in the design lip 12, a connecting wall 14, and an outside slide lip 15 connected with the connecting wall 14. Here, it is sufficient to leave the design lip 12 alone.

Figure 4:
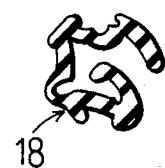
FIG. 4 is a sectional view taken along line IV-IV of FIG. 2.
Figure 9:
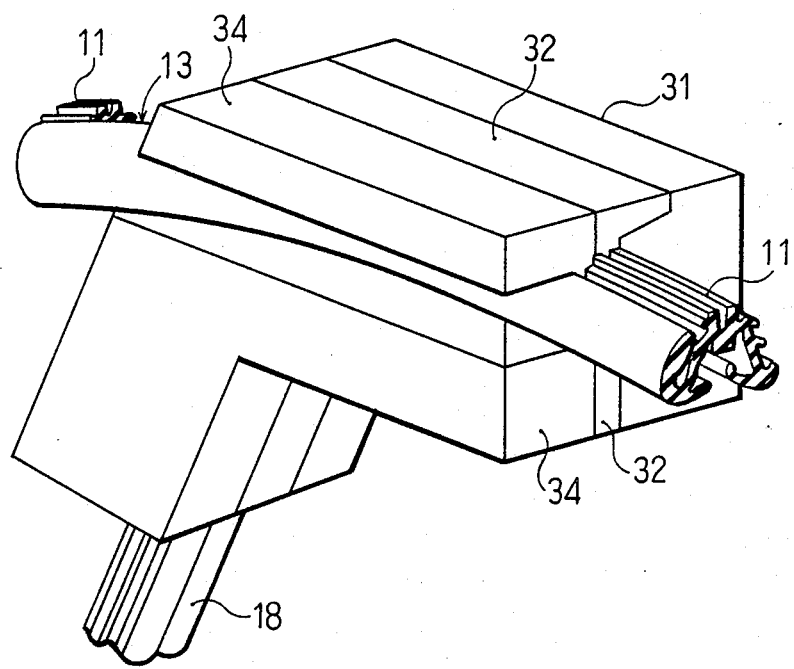
FIG. 9 is a perspective view of a mold used in molding the division-bar branch section of FIG. 8.
Figure 8:
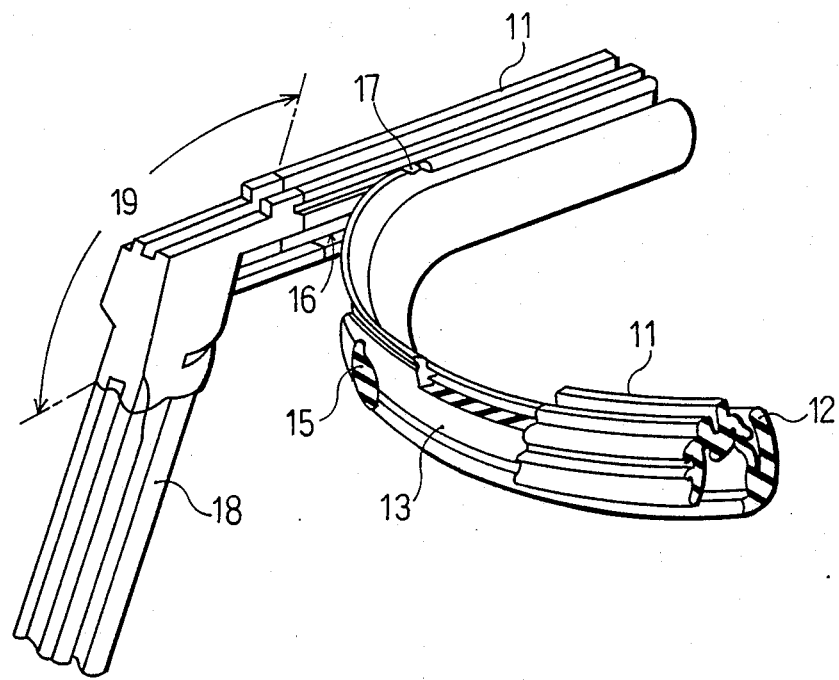
FIG. 8 is a perspective view showing an important portion of a division-bar branch section of the embodiment.

The separate division-bar portion 18 is connected via a molded portion 19 with the face, on the side of the liftable-glass 3, of the notched portion 13 of the roof-side portion 11 (see FIG. 8). The division-bar portion 18 is prepared usually by cutting an extruded component having such a sectional shape as shown in FIG. 4. The molded portion 19 is shaped as shown in FIG. 9 by setting both the notched portion 13 of the roof-side portion 11 made of an integrally extruded component and the division-bar portion 18 in an L-shaped two-direction mold. In this drawing, 31 is a lower mold, 32 an intermediate mold and 34 an upper mold.

To allow the design lip 12 to independently deviate from the face on the side of the liftable-glass, a slit 16 of predetermined length is formed toward a root portion. The length of this slit 16 is selected such that sufficient relief movement can be given to the molded connecting portion 19 when fitting the quarter-window assembly, and is usually on the order of 3 to 4 cm. Here, it is not necessary but common to bore a splitting preventive hole 17 at the root portion of the slit 16. Further, the slit 16 is usually formed close to the outer surface of the molded portion, but may be formed close to the inner surface through curving.

Figure 10:
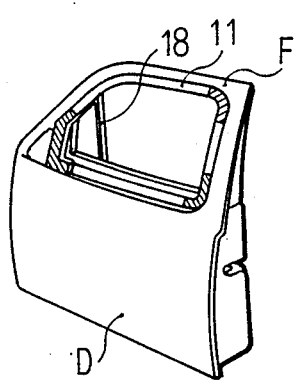
FIG. 10 (A), (B), (C), (D) and (E) are diagrams showing the steps for fitting the glass-run for automobiles.
Figure 10:
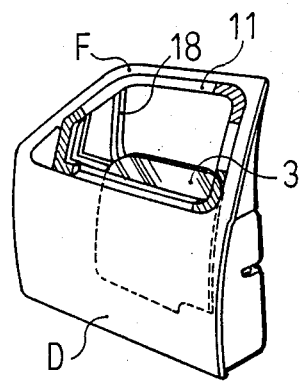
Figure 10:
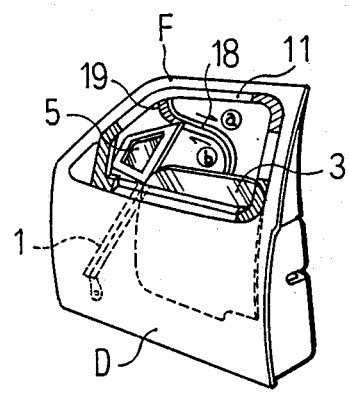
Figure 10:
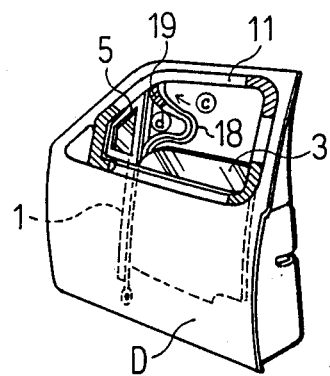
Figure 10:
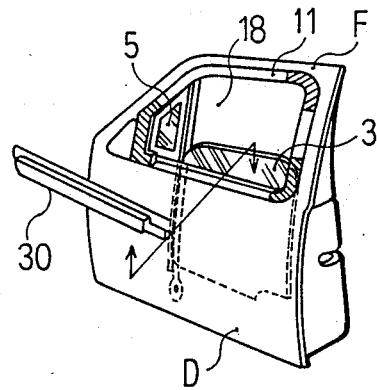

The steps for fitting the glass-run and the quarter-window assembly to the frame are as follows (see FIG. 10 in which shaded portions represent the molded portions):

(1) Fit the glass-run to the frame F (FIG. 10A). In this stage, the division-bar portion 18 is hanging down freely from the roof-side portion 11.

(2) Build in the liftable-glass 3 (FIG. 10B).

(3) Pull out the division-bar portion 18 together with the molded portion 19 in the direction of arrow ⓐ and push in the quarter-window assembly 5 and the division-bar 1 united together in the direction of arrow ⓑ (FIG. 10C).

(4) After the quarter window assembly 5 is fitted in place, fit the division-bar portion 18 to the division-bar 1 (FIG. 10D). Specifically, after the whole division-bar portion 18 is fitted to the division-bar 1, push in the molded portion 19 in the direction of arrow ⓒ.

(5) Finally, fit a door glass weatherstrip 30 (FIG. 10E).

The division-bar portion may be made of two components: a division-bar upper portion 18a and a division-bar lower portion 18b. In this case, it is no matter whether the lower portion 18b is fitted to the quarter-window assembly beforehand or in a later state.

What is claimed is:

1. A door glass-run for automobiles adapted to be fitted to the frame of a car-door whose window opening is divided vertically by a division-bar such that a liftable-window and a quarter-window assembly are fitted to the window opening with the division-bar constructing part of the quarter window assembly, comprising:
    a roof-side portion for holding the respective upper sides of the liftable-window and the quarter-window which includes a design lip disposed outside the car, and
    a division-bar portion branching from the roof-side portion, wherein
    said roof-side portion is prepared of an integrally extruded component,
    said roof-side portion is notched at a branch section, from which the division-bar portion is branched, to define a notched portion which includes at least the design lip,
    the face, on the side of the liftable-window, of the notched portion is connected via a molded portion with a separate division-bar portion, and
    a slit of predetermined length is formed extending from the face on the side of the liftable-window toward a root portion so that the division-bar portion can be bent independently of the design lip.

2. A door glass-run for automobiles according to claim 1, wherein a splitting preventive hole is bored at the root portion of the slit formed in the roof-side portion.

3. A door glass-run for automobiles according to claim 1, wherein the slit formed in the roof-side portion extends along the outer surface of the molded portion.

* * * * *